United States Patent
Himayat et al.

(10) Patent No.: US 10,834,223 B2
(45) Date of Patent: Nov. 10, 2020

(54) HYBRID INFORMATION-CENTRIC AND HOST-ORIENTED NETWORKS

(71) Applicant: Intel Corporation, Santa Clara, CA (US)

(72) Inventors: Nageen Himayat, Fremont, CA (US);
Srikathyayani Srikanteswara, Portland, OR (US); Christian Maciocco, Portland, OR (US); Hassnaa Moustafa, Portland, OR (US); Eve M. Schooler, Portola Valley, CA (US); Andrew Stephen Brown, Hillsboro, OR (US); Rath Vannithamby, Portland, OR (US); Sebastian Schoenberg, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 428 days.

(21) Appl. No.: 15/638,092

(22) Filed: Jun. 29, 2017

(65) Prior Publication Data

US 2018/0146071 A1 May 24, 2018

Related U.S. Application Data

(60) Provisional application No. 62/424,985, filed on Nov. 21, 2016.

(51) Int. Cl.
*H04L 29/08* (2006.01)
*G06F 16/23* (2019.01)
(Continued)

(52) U.S. Cl.
CPC .......... *H04L 67/2842* (2013.01); *G06F 16/23* (2019.01); *G06F 16/9574* (2019.01);
(Continued)

(58) Field of Classification Search
CPC . H04L 67/2842; H04L 29/08; H04L 41/5006; H04L 41/5025; H04L 41/5035; H04L 43/12; H04L 43/16; H04L 45/04; H04L 45/14; H04L 45/60; H04L 45/74; H04L 47/20; H04L 47/286; H04L 47/783; H04L 61/2076; H04L 67/10; H04L 67/1097; H04L 67/12; H04L 67/16;
(Continued)

(56) References Cited

U.S. PATENT DOCUMENTS

| | | | |
|---|---|---|---|
| 2016/0100350 A1* | 4/2016 | Laraqui | H04L 67/2842 370/328 |
| 2017/0237660 A1* | 8/2017 | Trossen | H04L 45/741 370/392 |
| 2019/0223045 A1* | 7/2019 | Roeland | H04L 67/12 |

* cited by examiner

*Primary Examiner* — Eric Myers
(74) *Attorney, Agent, or Firm* — Schwegman Lundberg & Woessner, P.A.

(57) ABSTRACT

Generally discussed herein are systems, devices, and methods for interfacing between a host-oriented network (HON) and an information-centric network (ICN). A device can include a first interface to couple to a host-oriented network (HON), a second interface to couple to an information-centric network (ICN), a memory including data stored thereon mapping named data in the ICN to a respective host in the HON, and content processing circuitry to receive an interest packet or content packet from the ICN through the first interface, produce a corresponding HON packet based on the mapping in the memory, and provide the HON packet to the HON through the second interface.

21 Claims, 10 Drawing Sheets

(51) Int. Cl.
*H04L 12/24* (2006.01)
*G06F 16/957* (2019.01)
*H04L 12/26* (2006.01)
*H04L 29/06* (2006.01)
*H04L 12/841* (2013.01)
*H04L 12/773* (2013.01)
*H04L 12/741* (2013.01)
*H04L 12/813* (2013.01)
*H04L 29/12* (2006.01)
*H04L 12/721* (2013.01)
*H04L 12/911* (2013.01)
*H04L 12/715* (2013.01)

(52) U.S. Cl.
CPC .......... *H04L 29/08* (2013.01); *H04L 41/5006* (2013.01); *H04L 41/5009* (2013.01); *H04L 41/5025* (2013.01); *H04L 41/5035* (2013.01); *H04L 43/12* (2013.01); *H04L 43/16* (2013.01); *H04L 45/04* (2013.01); *H04L 45/14* (2013.01); *H04L 45/60* (2013.01); *H04L 45/74* (2013.01); *H04L 47/20* (2013.01); *H04L 47/286* (2013.01); *H04L 47/783* (2013.01); *H04L 61/2076* (2013.01); *H04L 67/10* (2013.01); *H04L 67/1097* (2013.01); *H04L 67/12* (2013.01); *H04L 67/16* (2013.01); *H04L 67/2876* (2013.01); *H04L 67/327* (2013.01); *H04L 67/42* (2013.01); *H04L 69/22* (2013.01)

(58) Field of Classification Search
CPC ... H04L 67/2876; H04L 67/327; H04L 67/42; H04L 69/22; G06F 16/9574; G06F 16/23
See application file for complete search history.

HYBRID INFORMATION-CENTRIC AND HOST-ORIENTED NETWORKS

REFERENCE TO RELATED APPLICATION

This application claims the benefit of priority to U.S. provisional patent application No. 62/424,985, titled INFORMATION-CENTRIC NETWORKING METHODS AND APPARATUSES and filed on Nov. 21, 2016, the contents of which is incorporated by reference herein in its entirety.

TECHNICAL FIELD

Embodiments generally relate to network systems and, more particularly, to systems, devices, and methods that include some information-centric network (ICN) components and some host-oriented network (HON) components.

TECHNICAL BACKGROUND

A network architecture can include node communication based on Internet Protocol (IP) addresses. This type of architecture is sometimes referred to as a host-oriented network (HON). A HON includes respective communications between respective source and destination devices, one wishing to access a resource and one providing access to the resource. IP packets thus identify a source and destination for each packet. A lot of Internet traffic is comprised of conversations between sources and destination devices using Transmission Control Protocol (TCP).

A HON may not be a best match for some communications. A lot of Internet communications regard access to content irrespective of its location. In an ICN, a data unit is requested, routed, and delivered via a name of the data unit rather than an address of a host of the data unit. An ICN architecture may provide more reliable and/or efficient communication between devices as compared to a HON (e.g., under conditions of device mobility and intermittent connectivity). An ICN allows content to be named at a network layer or upper layers. Such name can help disassociate the IP address from the location, as opposed to IP addresses as allowed by the HON.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
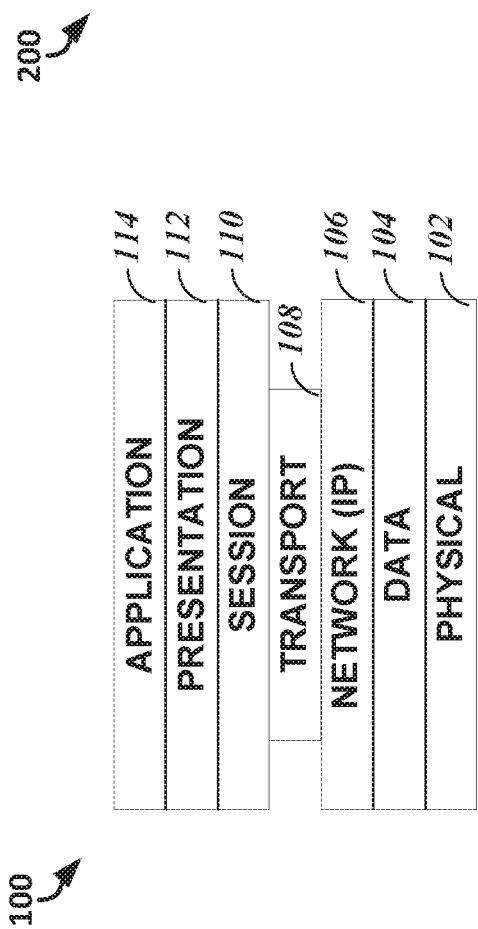
FIG. 1 illustrates, by way of example, a logical block diagram of an embodiment of layers of a HON.

Examples in this disclosure relate to devices, systems, and methods that include networks that include an ICN portion and HON portion. Some networks may include a combination of a HON and an ICN. Interfacing between the devices of the HON and ICN may be challenging.

ICNs shift the paradigm from node endpoint-addressed routing of data to a routing based on named content. In an ICN, the name of the content is used to route data in response to interests. Since addressing is based on a content name (e.g., an interest name), the source from which data is served becomes secondary in an ICN. This allows for various optimization options, for example caching data natively in the network at "arbitrary" nodes of the system (e.g., any node capable of serving an interest packet). An interest packet can be served from a cache source that includes the content requested.

In contrast to a HON, ICN nodes communicate based on named content, instead of IP addresses. In a HON, a packet includes a header that defines a destination and includes a payload (data) to be transported to the destination. In ICN an interest, or content request message, is issued and a content object, or content return message, sometimes called a content packet, is returned. The content of the content packet can reside in and be retrieved from a distributed memory (e.g., distributed caches or other memories) or other memory.

Some basic differences between a HON and an ICN can include one or more of: (1) They use different name spaces. A HON uses IP address and an ICN uses content names. (2) An ICN includes a security primitive directly at the narrow waist (layer four, the transport layer), such as can include a signed content packet. No such security exists by default at layer four in the HON. (3) A HON sends packets to destination addresses, while an ICN uses Interest packets to fetch Data packets from sources (or intermediate nodes that previously received the data packets from sources or from other relay nodes). (4) A HON has a stateless data plane, while an ICN has a stateful data plane.

Embodiments herein can include a network that includes a portion implemented in an ICN and a portion implemented as a HON. ICN enabled networks are, in some embodiments, deployed incrementally. Some of the first deployments of ICN can be at or near the network edge. The network edge is the front-haul network of the radio access network (RAN) (e.g., a base station such as the access point (AP), enhanced NodeB (eNB), or gNodeB (gNB)) and it also extends to include the access network itself, in some embodiments.

ICN-enabled edge networks may connect with each other using legacy protocols, such as by using ICN Service Gateways (ICN SG).

There is a need to determine a) how ICN deployments map to legacy wireless networks, b) how the ICN protocol stack map to legacy stacks, c) how the ICN control plane interacts with legacy wireless networks (e.g., how an ICN session can be created using a legacy cellular network (e.g., a third generation partnership project (3GPP), wireless local area network (WLAN), or other network)), and/or d) how ICN gateways connect with different ICNs.

Discussed herein are embodiments that address deployments of ICN based on 3GPP and WLAN-based networks supporting various outdoor, hotspot, home, and enterprise deployments. While a 3GPP network is used to illustrate the main embodiments, the concepts are equally applicable to WLAN and other networks as well. Some issues addressed by embodiments of this disclosure include: A) how ICNs may be created within a particular legacy network (e.g., an ICN may only be introduced at the network edge, or it may span an entire network); B) given a particular deployment of an ICN, how the ICN layer is mapped to the legacy protocol stack used in the network; C) how the ICN control plane interworks with legacy signaling (e.g., how an ICN session is set up in a legacy cellular network); and/or D) how ICN gateways connect different ICNs with each other. An approach used by one or more embodiments, is to allocate a "network slice" to the ICN connection, allowing it to co-exist with other legacy protocols such as fourth generation long term evolution (LTE), or other network protocol. Current ICN deployments can be treated as overlays on top of an existing Internet Protocol (IP) network. Embodiments herein can create ICN networks within the legacy network in which ICN is supported natively within an island, but interworking functions are defined to connect ICNs to the legacy non-ICN (e.g., HON) segment of the network. For next generation networks, embodiments can use the network slicing, such that ICN connections can co-exist with existing connections in the network.

Embodiments provide various approaches towards introducing ICN within a legacy network (e.g., a HON). Such approaches may help introduce an ICN portion in future networks, whether they be commercial, enterprise, or home networks. The ICN portion may be rolled out as a self-contained "Island" (e.g., a portion of a network that operates using ICN protocols) within a legacy network. The island may connect only a subset of network nodes. Such islands can interface with legacy portions of a network through suitable interworking or gateway functions, such as can include application programming interfaces (APIs) or other software, circuitry, a combination thereof, or the like. Within the ICN network, ICN protocols of name/content based information access & routing, rather than the legacy source/destination (HON) model of establishing connections, can apply.

Embodiments describe various methods by which an ICN may exist in a legacy network. Embodiments provide various options for mapping (identifying parts of the network where ICN protocols apply) an ICN within the legacy (e.g., 3GPP or other HON) network. For example, an ICN may be deployed within a legacy network such that its scope spans only the user equipment (UEs), the Access Network part of the legacy network, or it may span the entire UE, access network, and core network. Embodiments indicate which legacy entities may serve as interworking nodes to provide communication between the ICN and the HON network. Embodiments further include details regarding how an E2E (end-to-end) combination ICN and HON connection may be set up and what protocol layers may be used for the connection.

Setting up an E2E connection comprising ICN and HON network connection segments may be carried out in several ways. In one or more embodiments, slicing may be used to set up these E2E connections. In other embodiments, other methods of providing E2E connections may be used.

"Slicing", as used herein, refers to the process of creating network portions that adhere to a protocol (e.g., a HON or ICN protocol). The slice can include the device (e.g., UE), the RAN (Radio Access Network, sometimes referred to as the access network), the core network of the mobile network, and/or the Internet (as explained in more detail below). A slice is dedicated to a specific usage model (e.g., ICN or HON), dedicating RAN, core and/or other component resources to this slice.

An E2E connection may include operation of an ICN specific slice and a slice on the legacy network. The network slicing framework generalizes the notion of connections to create, identify, and manage different types of connections requiring different combinations of E2E network resources. Note that the slicing framework is not only applicable to setting up E2E network connections across ICNs and legacy networks, but may also be used solely within the ICN or HON networks.

As previously discussed, a HON is different from an ICN. FIGS. 1-4 describe differences between the HON and the ICN and basic structures that are used in an ICN.

Figure 2:
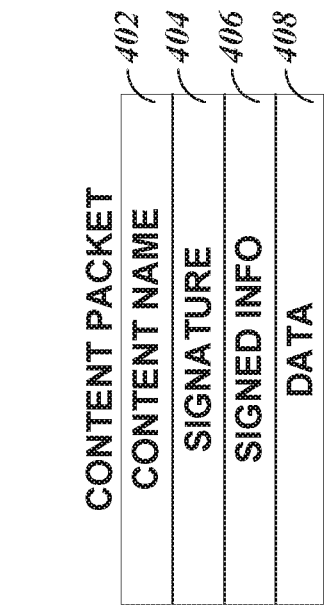
FIG. 2 illustrates, by way of example, a logical block diagram of an embodiment of layers of an ICN.

FIG. 1 illustrates, by way of example, a logical block diagram of an embodiment of layers 100 of a HON. FIG. 2 illustrates, by way of example a logical block diagram of an embodiment of layers 200 of an ICN. The stacks illustrated are merely examples and do not preclude ICN from being over lower layers of a network. The typical open systems interconnect (OSI) model is broken into seven layers. The seven layers include the physical layer 102 (layer one), data link layer 104 (layer two), network layer 106 (layer three), transport layer 108 (layer four), session layer 110 (layer five), presentation layer 112 (layer six), and application layer 114 (layer seven). In the seven layer model the physical layer is referred to as layer one and the application layer is layer seven with layers numbered in order therebetween. When an item is said to be in a lower layer, that means that the item is in a layer with a lower number than the layer being referenced. For example, a lower layer relative to the transport layer (layer four) includes the network layer, data link layer, and/or the physical layer. A higher layer relative to the transport layer (layer four) includes the session layer, the presentation layer, and/or the application layer.

The HON layers 100 and the ICN layers 200 include copper, fiber, radio, or the like at a physical layer 102 and 202 (layer one). This layer is the same in both the HON and the ICN. The HON layers 100 as illustrated include a physical layer 202, a data link layer 204, a network layer 206, a transport layer 208, and an application layer 210.

Figure 3:
FIG. 3 illustrates, by way of example, a logical block diagram of an embodiment of an interest packet.

In an ICN, an interest packet is issued by a user interested in obtaining content and a data packet including the requested content can be provided to fulfill the interest indicated (by content name) in the interest packet. FIG. 3 illustrates, by way of example, a logical block diagram of an embodiment of an interest packet 300. The interest packet 300 includes fields that allow a user to define the content requested in the interest packet 300. The fields, as illustrated, include a content name 302, a selector 304, and a nonce field 306. A content object can be named, by a content publisher or user, such as by using a hierarchy of binary name segments. A requested content (content identified by content name in an interest packet) need not be perfectly defined. For example, a user can indicate a portion of the content name and use a "wildcard" indicator to identify that the content name is incomplete. In another example, the content name can be complete except for the extension (e.g., ".pdf", ".doc", ".mp3", or the like) and a wild card can be used in place of the extension. In such instances, the router can attempt to retrieve the highest quality format that is available and in a format compatible with the device that issued the interest packet. Attributes of the device are discussed elsewhere herein. The selector allows a user to specify a specific source for the content associated with the content name or otherwise be more specific with regard to a scope of data to be returned in response to the interest packet 300. The nonce field 306 can be used to limit an amount of time the interest packet 300 persists before being discarded, ensure that the content is authentic (e.g., originates from a specified publisher, is a specified version, has not been tampered with or otherwise altered, or the like).

Figure 4:
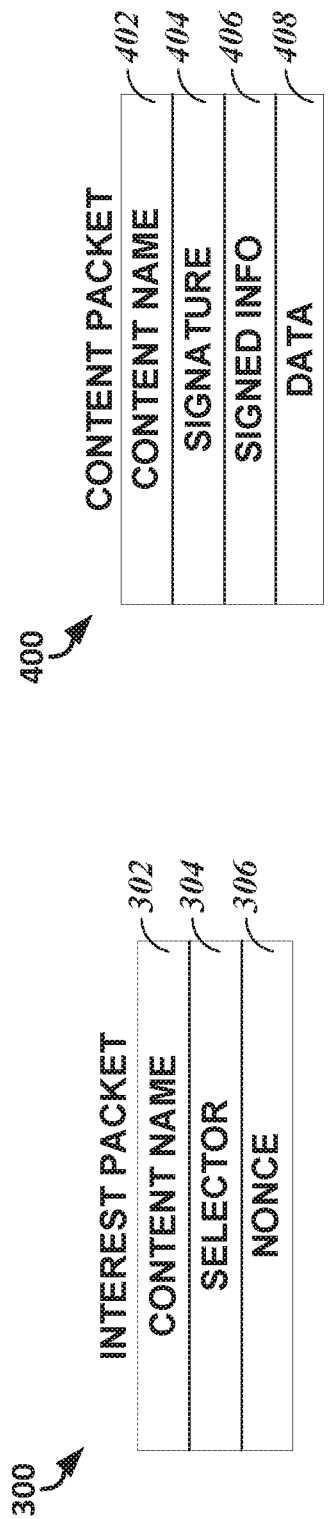
FIG. 4 illustrates, by way of example, a logical block diagram of an embodiment of a content packet.

FIG. 4 illustrates, by way of example, a logical block diagram of an embodiment of a content packet 400. The content packet 400 can include fields that allow a user issuing a corresponding interest packet to verify the content is authentic, provide security for the content requested, and/or provide the requested content to the requester. The fields as illustrated include a content name 402, a signature 404, a signed information 406, and data 408 (e.g., the requested content, such as in an encrypted, compressed, unencrypted, and/or uncompressed format).

The content name 402 can be the same as the content name 302. In some ICN configurations, a user does not need to define a complete content name, and in such instances the content name 302 can be different from the content name 402. The signature 404 can include a cryptographic signature that binds the content name to a payload (the data 408). The user that issued the interest packet 300 can access the data 408 if the user has a key of the publisher, such as can be determined using data from the signature 404 or the signed information 406. In one or more embodiments, the data required to access the content can be provided in the interest packet 300, such as in the nonce field 306. The signed information 406 can include an indication of how the content is compressed or encrypted or data indicating that the content in the data 408 is authentic. The signed information 406 can include an identification of the publisher, a location of a key that can be used to decrypt the data 408 and/or verify the authenticity of the data 408, an amount of time after which (or a specified time at which) the data becomes "stale" (e.g., no longer relevant or superseded by more accurate data), or the like.

The ICN routes the interest packet 300 and a pending interest table (PIT) of the interest packet 300 (not shown) is updated to record a path of the interest packet 300 through the network. After finding a content object that includes a name that sufficiently matches the name specified in the interest packet, the content object is routed back to the issuer, such as in the content packet 400, by reversing the path specified in the PIT (in current ICN routing techniques).

Figure 5:
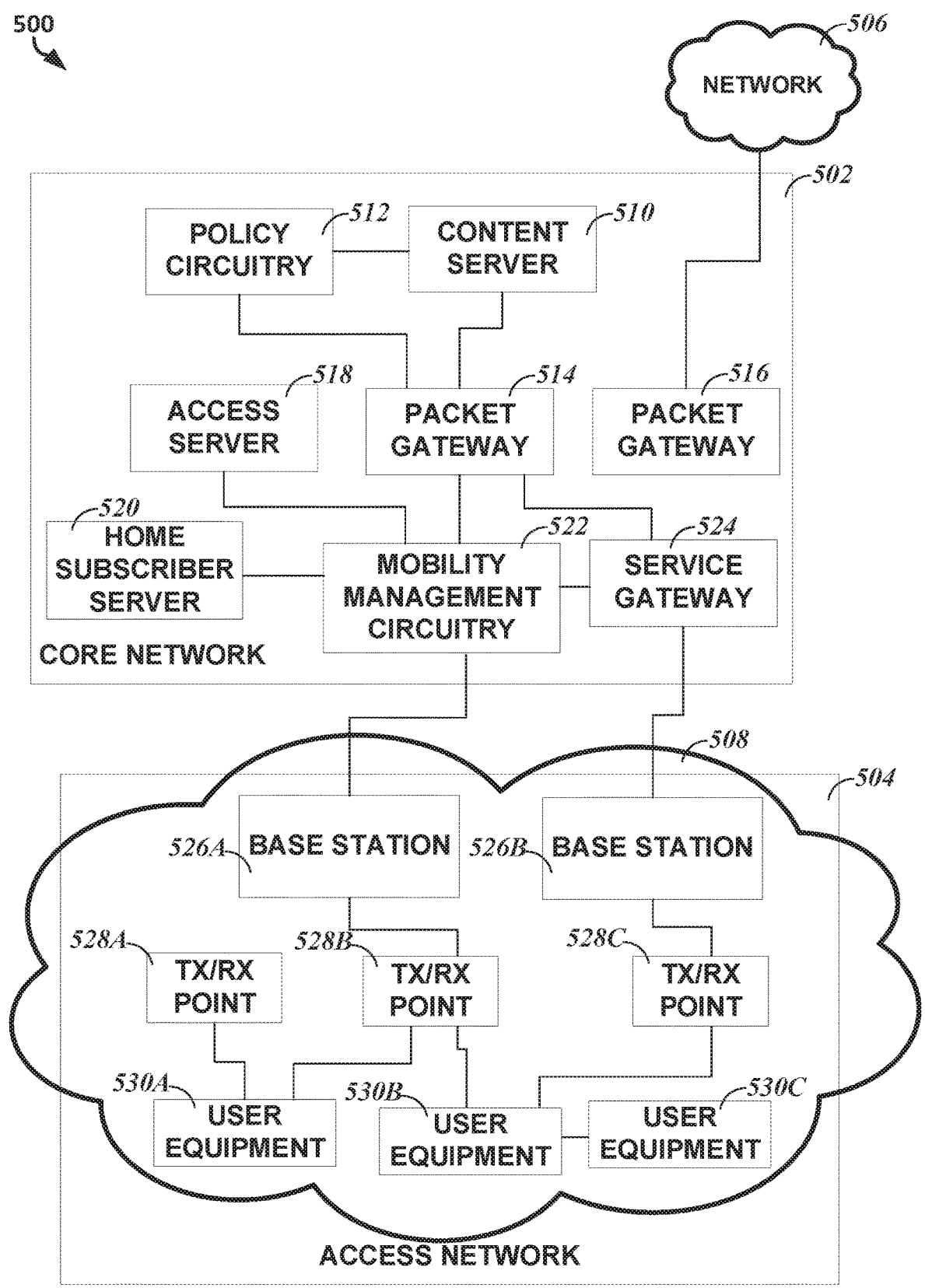
FIG. 5 illustrates, by way of example, a diagram of an embodiment of a hybrid network.

FIG. 5 illustrates, by way of example, a diagram of an embodiment of a system 500. The system 500 as illustrated includes a core network 502, an access network 504, an external network 506 (e.g., the Internet), and an ICN 508.

The core network 502 is a part of a telecommunications network that provides services to devices connected by the access network 504. The core network 502 can connect providers to each other. The core network 502 is typically maintained by an Internet service provider (ISP). The core network 502 can provide data routing services, such as to allow a user to call, text, upload, download, or the like. The core network 502 typically provides data link layer 104 and network layer 106 circuitry and logic.

The access network 504 is a part of the telecommunications network that connects a device to the core network 502 or other network, such as the Internet. The access network 504 includes user equipment, an access point or base station, and devices connected therebetween.

The network 506 can include the Internet, other core network, other network, such as a local area network (LAN), wide area network (WAN), or the like.

The core network 502 as illustrated includes a content server 510, policy circuitry 512, first packet gateway 514, second packet gateway 516, access server 518, home subscriber server 520, mobility management circuitry 522, and a service gateway 524. The content server 510 stores content for access by devices connected or coupled to the core network 502.

The policy circuitry 512 provides access control for the content on the content server 510. In one or more embodiments, the policy circuitry 512 can implement a policy and charging rules function (PCRF). The policy circuitry 512 can aggregate data in/out of the core network 502 and/or operational support systems (OSS), such as in real time. The policy circuitry 512 can determine quality of service (QoS), charging rules, and/or access permissions, for example.

The packet gateway 514 provides an interface between a UE and a trusted network. The packet gateway 514 can include control and data plane stacks to support an interface with the service gateway 524. The control plane can include Internet protocol (IP), user datagram protocol (UDP), and/or evolved general packet radio service tunneling protocol for control plane (eGTP-C). The packet gateway 514 provides an interface between the core network 502 and other packet data networks.

The packet gateway 516 communicates with the environment external to the core network 502. The packet gateway 516 can provide an interface between one or more external networks 506 and a UE. The packet gateway 516 can access keys from the access server 518 and/or HSS 520 in providing communication between the network 506 and the UE.

The mobility management circuitry 522 controls operation of mobility by signaling messaging and the HSS 520. The mobility management circuitry 522 is responsible for initiating paging and authentication of the UE.

The service gateway 524 forwards data between the base station 526B and the packet gateway 514. The service gateway 524 can act as a router for data between the access network 505 to the core network 502.

The HSS is a database that includes information regarding subscribers to the core network 502.

The ICN 508 spans the access network 504 in the embodiment of FIG. 5. The ICN 508 thus includes the UE 530A-530C, the base station 526A-526B and devices coupled therebetween.

In the system 500, the ICN 508 can be supported over layer 2 within the ICN 508. IP packets to and from the core network 502 can be encapsulated within the ICN packets, such as to be a part of the content of the ICN packets. The IP layer may be transparent within the access network 504.

A slice in the system 500 can include one or more of the following modifications. The UE 530A-530C can connect to the access network 504, such by using a layer 2 protocol (e.g., a random access protocol), such as to establish a bootstrap ICN connection with the access network 504. The UE 530A-530C can become authenticated to operate within the access network 504, such as by using a combination of ICN and HON protocols.

After authentication, the access network 504 can set up a network slice for default data radio bearer (DRB) for transporting ICN messages between the UE 530A-530C and the access network 504. If a UE 530A-530C requests data from a particular source, then the routing layer maps the request to a named object and sends out interest packets within the access network 504 over the DRB. In the access network 504, the base stations 526A-526B (as well as the UEs 530A-530C) can be capable of routing ICN traffic. For example, a base station 526A-526B can be able to route ICN packets to other base stations over an X2 interface.

If the interest is unable to be satisfied by the edge nodes (e.g., the UEs 530A-530C), then an ICN-service gateway, such as at the base station 526A-526B, can translate the request to an IP address of the source. The access network 504 ICN-service gateway can then act on behalf of the UE 530A-530C to establish an evolved packet system (EPS) bearer corresponding to the requested connection and route the packets received from the packet gateway 514 to the UE 530A-530C, such as by using an ICN-based routing protocol. After the information is received, the data is cached in the ICN 508 (e.g., an ICN island) and can be used to satisfy further requests to the same data. While this model applies for pulling data to the edge nodes, if the edge nodes have to push data to the core network 502, then as the core network is using legacy protocols, the ICN service gateway at the network edge may have to have subscriptions or interest packets alive at all times, such as to help ensure the data is routed to the core network. For example, routing in ICN may maintain a pending interest table that lists the packets sent to the core network. An interest may be re-sent to help ensure that the pending interest stays open. Alternatively a long interest may be opened and all content may be received through that open interest.

As mentioned, the interworking with the external network (e.g., the core network 502 in this example) can be accomplished using a gateway at the eNodeB (or other base station/access node). The service gateway may perform non-access stratum (NAS) signaling on behalf of the UE 530A-530C. The mobility management circuitry 522 can play the role of the directory or policy server, such as to facilitate interworking between the core network 502 and the access network 504. In an embodiment in which the UE 530A-530C can support both ICN and HON NAS signaling functionality, the access network 504 can directly request the UE 530A-530C to establish an E2E session with the core network 502.

For an embodiment in which the edge network implements ICN as an IP overlay and the core network 502 is a legacy network, information that travels outside the edge network can bypass the ICN layer in its own edge network, and use the ICN layer in the destination edge network for locating information.

Figure 6:
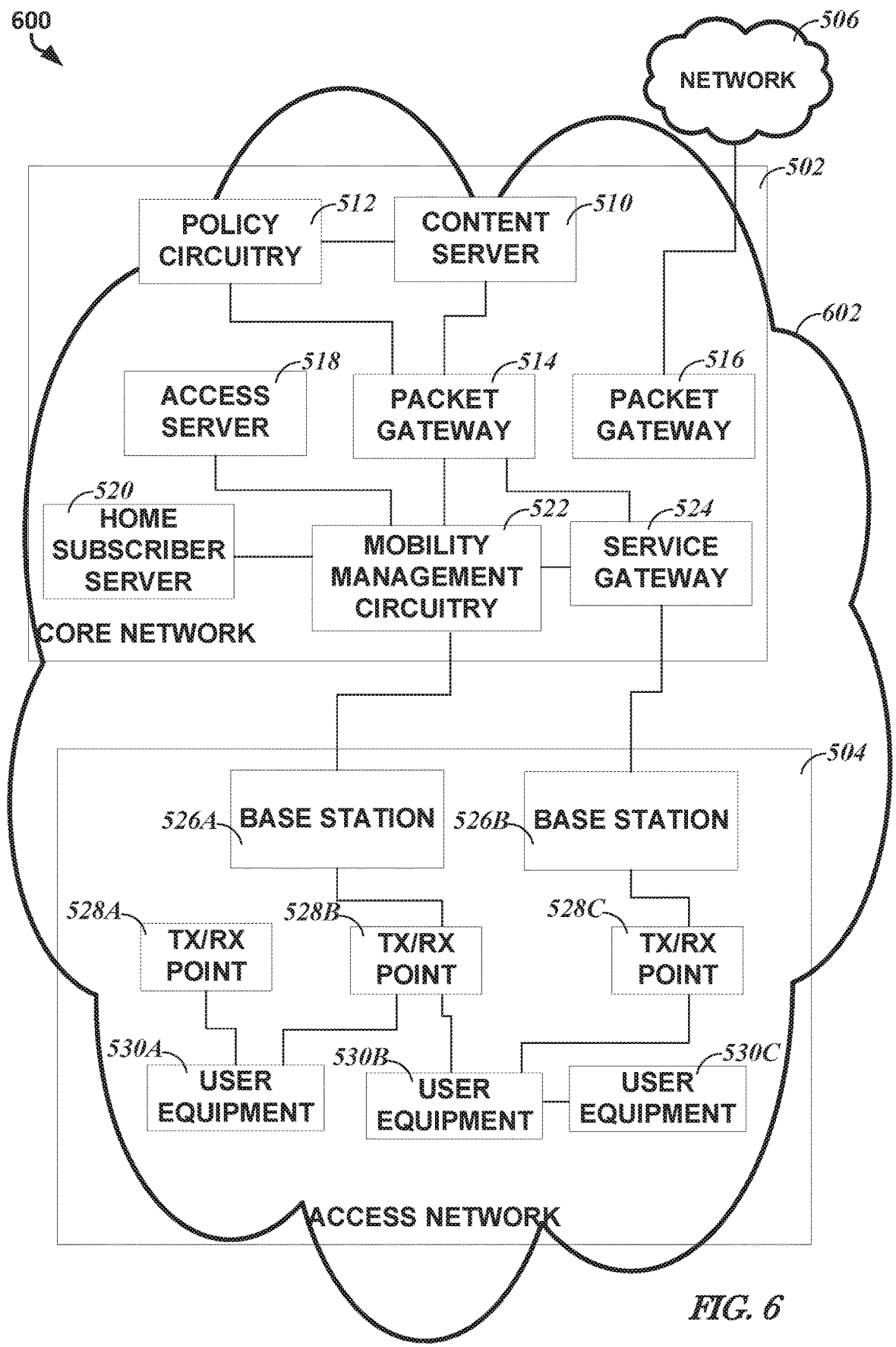
FIG. 6 illustrates, by way of example, a diagram of an embodiment of another hybrid network.

FIG. 6 illustrates, by way of example, a diagram of an embodiment of another network 600. The network 600 is similar to the system 500 with the network 600 including an ICN 602 that spans the entirety of the core network 502 and the access network 504.

In this mapping, the entire network is based on ICN and the interworking with the external networks is performed based on using traditional gateway functions (e.g., an ePDG (the packet gateway 516) or a P-GW (e.g., packet gateway 514)). In such embodiments, mobility management circuitry 522, service gateway 524, and/or the packet gateway 514 can provide the services for interfacing between the ICN and the HON.

In one or more embodiments, the ICN 602 can be mapped over layer 2, similar to the system 500, but in the access network 504 and the core network 502. In one or more other embodiments, the ICN may be an overlay on the HON. IP packets to and from gateways may be encapsulated in ICN packets. In yet other embodiments, high layer mappings are feasible.

ICN provides a new data distribution model that can be exploited using a new "slicing" architecture. The slicing architecture can support the ICN 602 within the cellular network. A 'network slice' can be used to support this functionality. This 'network slice' can span from the RAN (Radio Access Network) (e.g., the access network 504) to the packet gateway 516. The packet gateway can translate from ICN to a HON (e.g., traditional IP based network), unless the entire network is ICN and there is communication between ICN and HON.

This 'network slice' runs in parallel to other slices of the cellular network which could be for example a 4G/LTE slice, a massive stationary Internet of Things (IoT) devices (e.g., many IoT devices) slice, and/or a real-time IoT device slice, where the signaling protocol and the data plane protocol can be different in every slice. Slices on the various devices from the access network 504 to the core network 502 can be implemented in various ways (e.g., virtual machines/containers, hardware isolation, or the like).

In an ICN slice, UEs 530A-530C can connect to the RAN as cellular devices currently do. The mobility management circuitry 522 can negotiate the device admission into the network with the control plane which can reside on the service gateway 524 or be disaggregated (e.g., the service gateway can follow a software defined network (SDN) model with the control plane separated from the data plane). A network address (e.g., IPv4, IPv6, etc.) can be allocated to the UE 530A-530C in the cellular network, such as even if the content itself follows the ICN naming and retrieval. In one or more embodiments, content naming and retrieval can be separated from content's location.

A device unique identification can be used, such as for authentication and/or usage tracking, if the operator wants to charge for such usage. If the ICN 602 relies on global identifiers for UEs 530A-530C, then the packet gateway 516 can execute a mapping between global identifiers and IP addresses to forward the packets. Additionally or alternatively, communication between the devices doesn't have to follow a legacy tunnel-based communication model but the content can flow through the devices using a tunnel-less model, such as to improve efficiency and performance. At the entry/exit of the ICN 602 the gateway device, packet gateway 516 in the example of FIG. 6, can perform the necessary address translation if needed to connect to traditional IP based networks.

Figure 7:
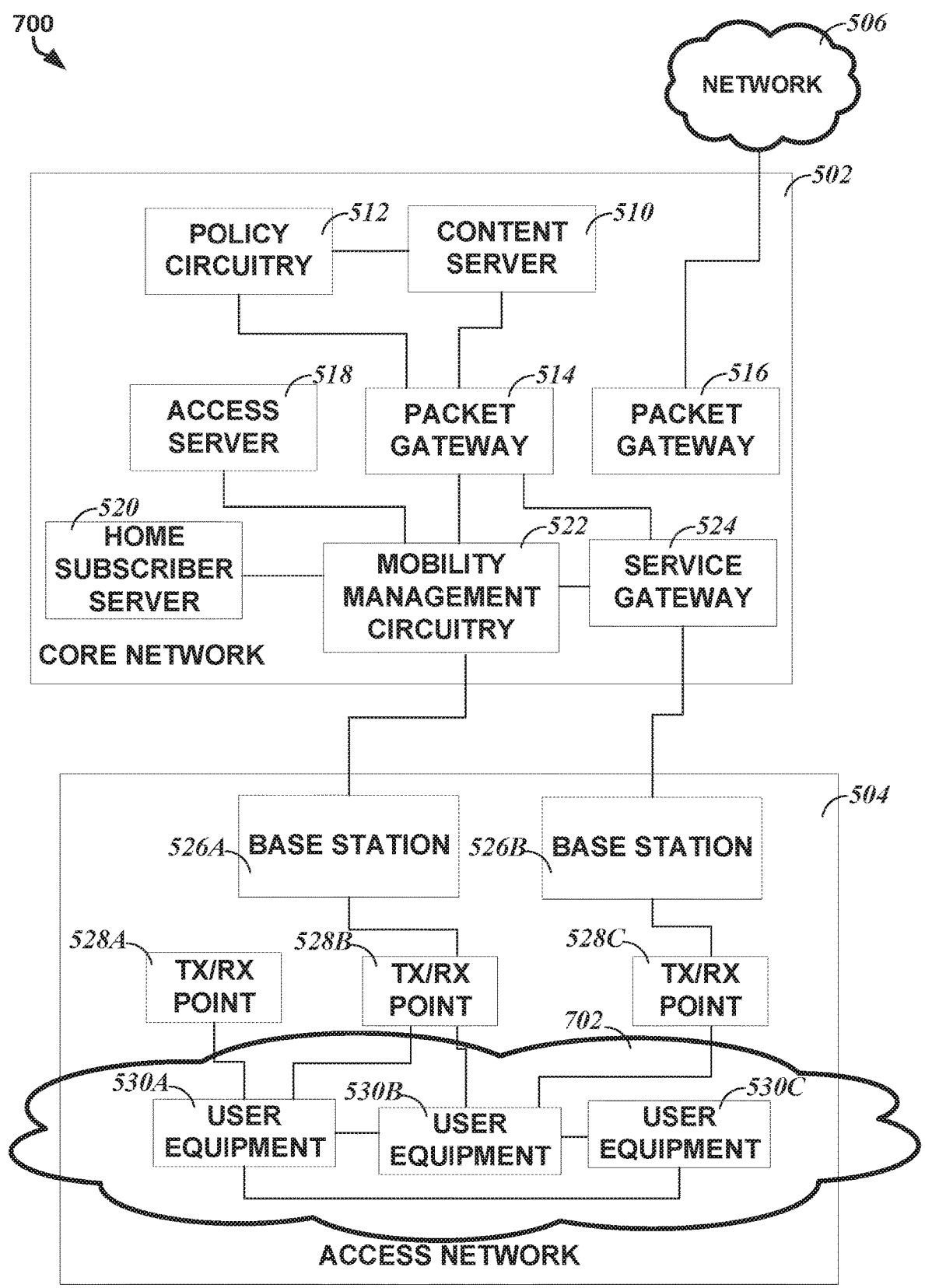
FIG. 7 illustrates, by way of example, a diagram of an embodiment of another hybrid network.

FIG. 7 illustrates, by way of example, a diagram of an embodiment of another network 700. The network 700 is similar to the systems 500 and 600 with the network 700 including an ICN 702 that spans only the UEs 530A-530C. The ICN 702 can include UEs 530A-530C communicating using device-to-device (D2D) or other direct communication between UEs 530A-530C.

FIG. 7 illustrates an embodiment in which the ICN 702 spans only the UEs 530A-530C. In the network 700 only device-to-device (D2D) communication is supported using ICN protocols, and the rest of the network remains a HON. FIG. 7 shows an instance of this mapping for a set of UE devices associated with a 3GPP LTE network, but this mapping applies for other networks of end-point devices. In this mapping, no signaling changes are required for connecting the UEs to the 3GPP access network 504 and core network 502. The UEs 530A-530C directly provide the interworking function, while communicating with each other using ICN-Server Gateway principles that can be performed on the UE 530A-530C.

ICN packets in the network 700 can be carried over a native device-to-device (D2D) communication protocol implemented between the UEs 530A-530C. The D2D protocol can include LTE-Direct, WiFi Direct, higher layer protocols, or the like. While FIGS. 5-7 show a 3GPP LTE network, the core network 502 can include a 3G, 4G, 5G, or other network.

As mentioned previously, in the embodiment of the network 700, no signaling changes are required for connecting the UEs 530A-530C to the access network 504 and core network 502. The UEs 530A-530C directly provide the interworking function, while communicating with each other using ICN-Server Gateway principles that can be a logical function on the UE 530A-530C. The UE layer 2 transport can be based on LTE-direct, WiFidirect or any local area protocol managed via the network. The access network 504 and core network 502 can still provide directory/policy services. In the network 700, ICN may also be deployed as an overlay network, in a manner transparent to the 3GPP network.

To provide ICN capability within a legacy network, there are a variety of possibilities, such as those shown in FIGS. 5-7. FIG. 5 illustrates an embodiment in which the ICN spans the UEs 530A-530C, the base stations 526A-526B and all devices coupled therebetween. In the system 500, the core network 502 is supported using HON protocols. The ICN 508 is supported using ICN protocols. In the embodiment of system 500, the base stations 526A-526B may serve as the rendezvous points between the ICN 508 and the HON network, the core network 502 in the embodiment of the system 500. The base stations 526A-526B may host an ICN server that provides directory, access control, and/or other policy services. Additionally or alternatively, one or more of these services may be hosted at the mobility management circuitry 522 and/or the mobility management circuitry 522 may be collocated with the base station 526A-526B. In this mapping, the layer 1 and layer 2 wireless protocols remain the same (LTE, WiFi, etc.). In embodiments in which the edge networks (from UE 530A-530C to the base stations 526A-526B) are an ICN, the network layer may be implemented using ICN protocol.

Figure 8:
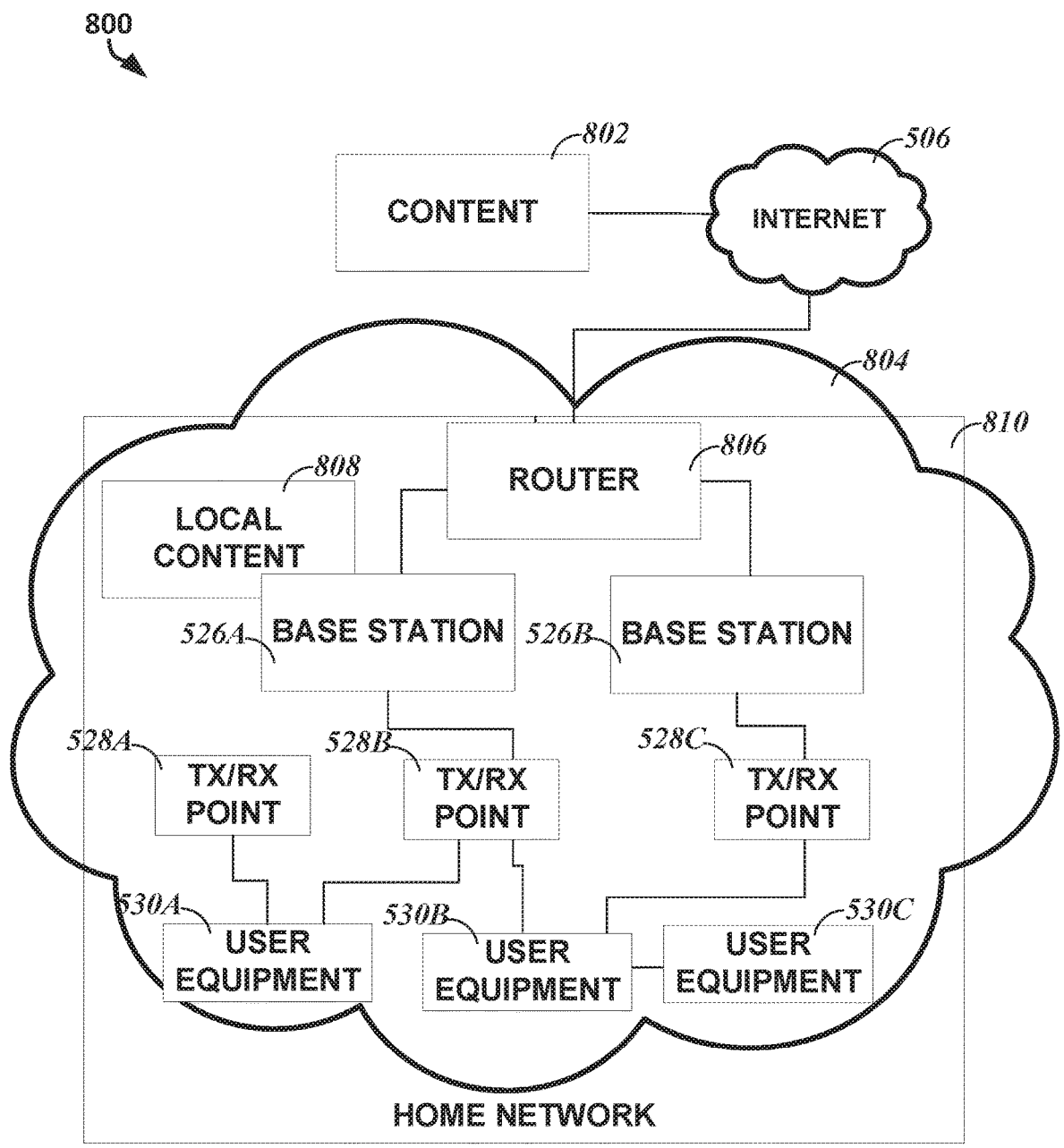
FIG. 8 illustrates, by way of example, a diagram of an embodiment of a system that includes a home network operating as an ICN.

FIG. 8 illustrates, by way of example, a diagram of an embodiment of a system 800 that includes a home network 810 operating as an ICN 804. The home network 810 is similar to the access network 504, with the home network 810 including a router 806 and local content 808.

The router 806 is a networking device that forwards data packets between networks. In the embodiment shown, the router 806 forwards data packets between the ICN home network 810 and the external network 506 (e.g., the Internet). The router 806 is coupled between the base station 526A-526B and the external network 506.

The local content 808 includes data available for access by network(s) including the external network 506 and devices of the home network 810. The local content 808 can be addressed and accessed as previously discussed regarding ICNs.

The content 802 includes data available for access by network(s) includes the external network 506 and devices of the home network 810 (e.g., the UEs 530A-530C). The content 802 can be addressed and accessed as previously discussed regarding HON networks.

In the system 800, an access network (not shown in FIG. 8) can be used only for layer 2 transport of the ICN packets destined for the core network (not shown in FIG. 8). The home network 810 thus resides below the transport layer.

Figure 9:
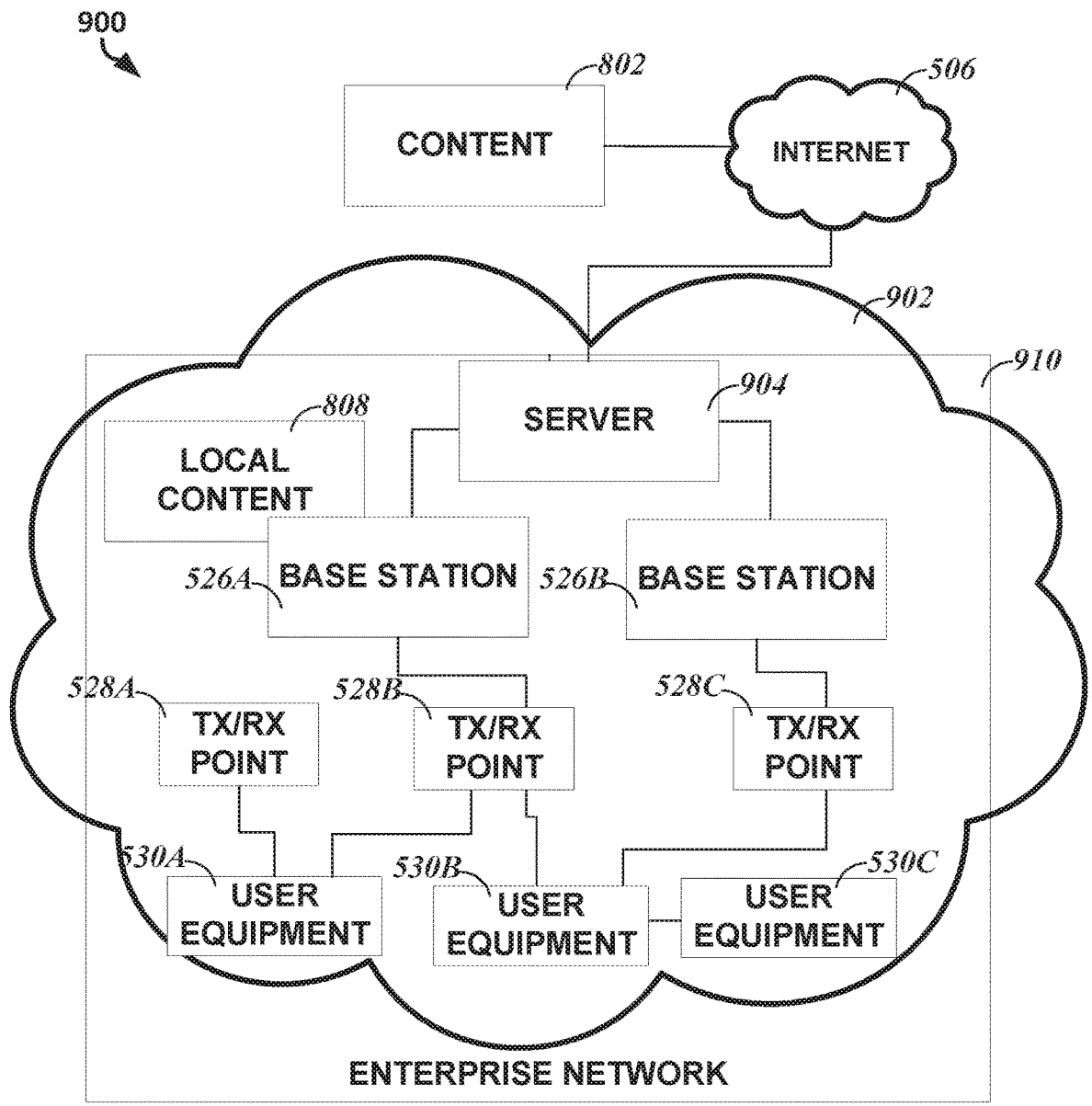
FIG. 9 illustrates, by way of example, a diagram of an embodiment of a system that includes an ICN including an enterprise network coupled to a HON network.

FIG. 9 illustrates, by way of example, a diagram of an embodiment of system 900 that includes an ICN 902 including an enterprise network 910 coupled to a HON network. The HON network in this embodiment is the external network 506 (e.g., an untrusted network). The enterprise network 910 is similar to the home network 810, with the enterprise network 910 implemented at a higher layer than the home network 810. The enterprise network 910 is implemented on top of the transport layer, such as to be connected to an external network through a server 904. The ICN 902 may be transparent to the core network (not shown in FIG. 9).

The server 904 can provide facilities to create web applications and an environment on which to run the web applications. The server 904 provides middleware services for security, data access, and/or persistence. The serer 902 can be an application server.

The server 904 can provide the functions required to interface between an ICN and HON. The server 904 can provide a DNS lookup to determine a destination of a content packet. The server 904 can create IP packets to provide to the HON and create content packets to provide to the ICN.

The interaction between ICN and HON can occur at ICN-service gateways which are either physical dedicated gateways (GWs), such as can exist at a network edge, or can be logical (e.g., circuitry, software, or combination thereof) GWs in the UE 530A-530C or the network edge. These GWs can run the ICN software stack as well as HON software stack. These GWs can translate both the control plane signaling as well as the data plane packets to and from the ICN/HON. The control signaling may be in-band and embedded in the data transport.

Named data network (NDN) signaling can be used in the ICN. Additional signaling can be introduced for interworking and co-existence between ICN and HON. Such additional signaling can include, for example, creating a vertical network slice from the radio access network (RAN) to the core network 502, to services that support ICN within the HON. The network slicing, which can include virtualization, can help create a separate realm for NDN mapping of control signals and/or data traffic. In one or more embodiments, such mapping can be accomplished through leveraging ICN protocols deployed as overlay services over the transport layer connecting different ICNs.

A network slice can include the network from the RAN (Radio Access Network, sometimes called the access network), through the core of the network, (e.g., the 4G/LTE Evolved Packet Core for mobile wireless network to Internet services). Different slices of the network can be created to handle different usage models. The slices do not have to communicate among themselves although nothing prevents that. For example, stationary IoT devices like water/gas/power meters or static city sensors do not need to handle the complexity required to support mobility, hence lowering compute and energy requirements for the device, signaling overhead and state maintenance for the core. A slice to support these devices and usage models can be created from the access network through the core of the network (e.g., a "Stationary IoT Slice"). A different slice with different requirements can include a "Real-Time IoT Slice." Such a slice can handle car-to-car communications and can support both mobility and real-time requirements. Yet a different slice can include a "4G/LTE Traditional Devices Slice." Such a slice can handle 4G/5G traditional devices. Yet another slice can include an "ICN Slice." Such a slice can include a different naming/routing scheme from traditional slices. These slices can have different requirements for throughput, latency, jitter, memory access, memory capacity (e.g., ICN content caching at the node level), etc. Some capabilities like cache monitoring and allocation, and I/O monitoring and allocation can help guarantee system level performance of the slices. For example, to guarantee a bounded throughput and latency variation for a "RealTime IOT Slice" exclusive usage of a portion of a cache, memory, and/or I/O can be dedicated to this slice. Other slices can share access to the other portions of the cache, I/O, and memory.

Figure 10:
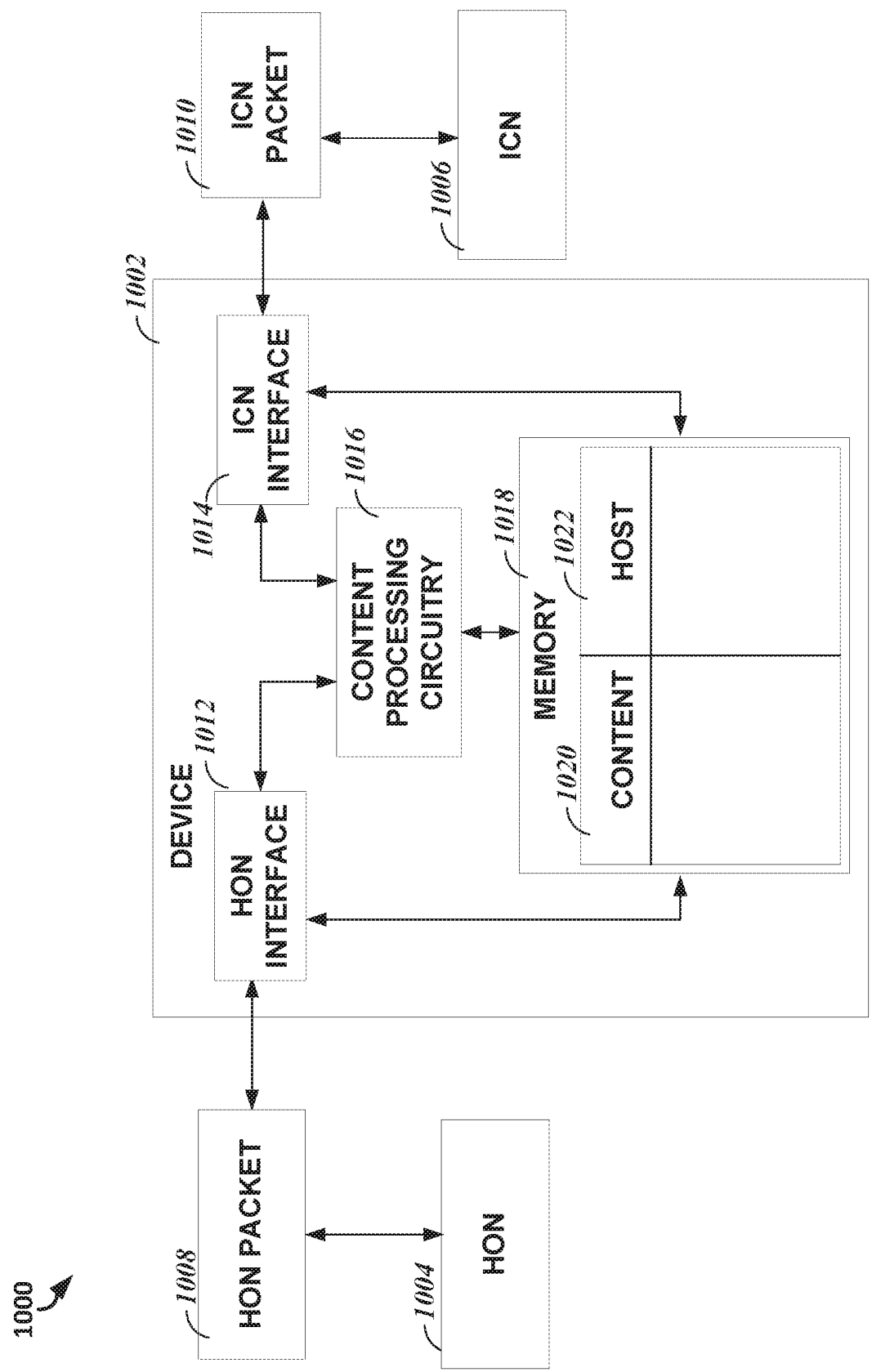
FIG. 10 illustrates, by way of example, an embodiment of a system for interfacing between a HON and an ICN.

FIG. 10 illustrates, by way of example, an embodiment of a system 1000 for interfacing between a HON 1004 and an ICN 1006. The system 1000, as illustrated, includes a device 1002 communicatively coupled between a HON 1004 and an ICN 1006. The HON 1004 provides HON packets 1008 to the device 1002. The ICN 1006 provides ICN packets 1010 (e.g., content packets or interest packets, such as interest packet 300 or content packet 400) to the device 1002. The HON 1004 can include the respective portions (e.g., slices or dedicated components) of the systems of FIGS. 5-9 that are not part of a respective ICN 508, 602, 702, 804, and 902. The ICN 1006 can include the respective portions (e.g., slices or dedicated components) of the systems of FIGS. 5-9 that are part of a respective ICN 508, 602, 702, 804, and 902.

The device 1002 as illustrated includes a HON interface 1012, an ICN interface 1014, content processing circuitry 1016, and memory 1018. The device 1002 can be an independent device or part of the mobility management circuitry 522, the service gateway 524, the base station 526A-526B, the UEs 530A-530C, the router 806, or the server 9-4.

The HON interface 1012 includes I/O circuitry, such as one or more ports. The HON interface 1012 can communicate the HON packet 1008 between the HON 1004 and the content processing circuitry 1016. The HON packet 1008 can include a transmission control protocol (TCP) (e.g., as described in RFC 793), user datagram protocol (UDP) (e.g., as defined in RFC 768), Internet protocol (IP) packet, or the like. The packets are well known. The contents of the HON packet 1008, in the case of an IP packet can include a source address, destination address, version field, IP header length (IHL), type-of-service field, total length field, identification field, flags field, time-to-live field, protocol field, header checksum field, source address field, destination address field, options field, and/or data field.

The ICN interface 1014 includes I/O circuitry, such as one or more ports. The ICN interface 1014 can communicate the ICN packet 1010 between the ICN 1006 and the content processing circuitry 1016. The ICN packet 1010 can include the interest packet 300, the content packet 400, or the like.

The content processing circuitry 1016 can receive the HON packet 1008, through the HON interface 1012, from the HON 1004, produce the ICN packet 1010, and provide the ICN packet 1010, through the ICN interface 1014, to the ICN 1006. The content processing circuitry 1016 can receive the ICN packet 1010, through the ICN interface 1014, from the ICN 1006, produce the HON packet 1008, and provide the HON packet 1008, through the HON interface 1012, to the HON 1004.

The content processing circuitry 1016 can access the memory 1018 to determine how to populate one or more fields of the HON packet 1008 and/or the ICN packet 1010. For example, the content processing circuitry 1016 can lookup content 1020 requested in the ICN packet 1010, determine a corresponding host address 1022 of the content 1020, determine a resulting host address 1022 of a node that requested the content 1020, and produce the HON packet 1008 based on the determined addresses. In such an example, the source address can be the host address of the node that includes the content and the destination address can be the host address of the node listed in a forwarding information base (FIB) as the destination of the content. In another example, the content processing circuitry 1016 can lookup content 1020 associated with a host address of a destination listed in the HON packet 1008 and produce a content packet to provide to the node associated with the host address. In either example, a node of an ICN is capable of communicating with a node of a HON.

The content processing circuitry 1016 can include electric or electronic components, such as can include one or more transistors, resistors, capacitors, inductors, diodes, regulators (e.g., current, voltage, and/or power regulators), multiplexers, logic gates, switches, buffers, amplifiers, oscillators, modulators, demodulators, interconnects (e.g., wired or wireless signal transfer mechanisms), antennas, radios (transmit and/or receive radios) or the like. The content processing circuitry 1016 can include an application specific integrated circuitry (ASIC), a programmable gate array (e.g., a programmable chip, such as can include a field programmable gate array (FPGA)), or the like. The content processing circuitry 1016 can be configured as a state machine configured to receive data from the memory 1018, the HON packet 1008, and the ICN packet 1010 and produce a packet based on the received data.

The memory 1018 can be local or remote to the device 1002. The memory 1018 can include a mapping of content 1020 to host address 1022 and/or vice versa stored thereon. Other data that can be stored on the memory 1018 can include data that can be used to fill in one or more fields of the ICN packet 1010 and/or the HON packet 1008.

Figure 11:
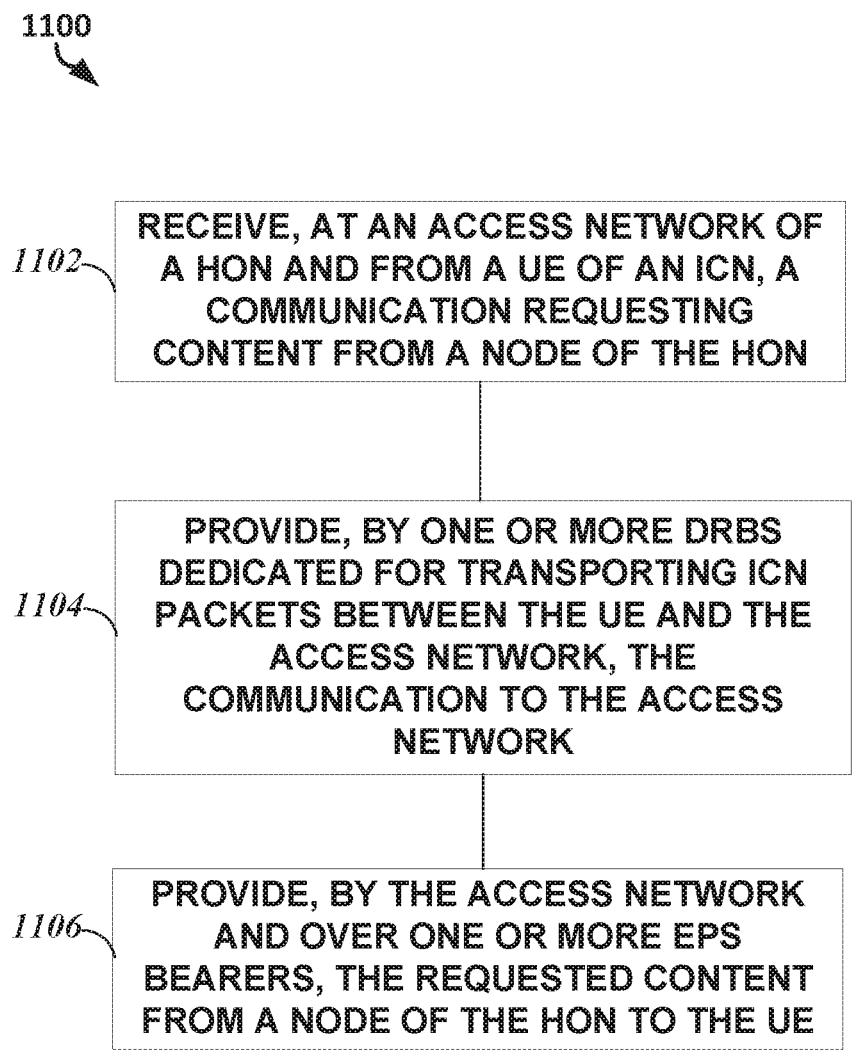
FIG. 11 illustrates, by way of example, a diagram of an embodiment of a method for interfacing between a HON and an ICN.

FIG. 11 illustrates, by way of example, a diagram of an embodiment of a method 1100 for interfacing between a HON and an ICN. The method 1100 can be performed by one or more components of the device coupled to the HON and the ICN, such as the device 1002. The method 1100, as illustrated, includes receiving, at an access network of a host-oriented network (HON) and from a user equipment (UE) of an information-centric network (ICN), a communication requesting content from a node of the HON, at operation 1102; providing, by one or more data radio bearers dedicated for transporting ICN packets between the UE and the access network, the communication to the access network, at operation 1104; and providing, by the access network and over one or more EPS bearers, the requested content from the node of the HON to the UE, at operation 1106.

The communication to the access network can be over layer two or three of the access network. The method 1100 can further include authenticating, by the access network, the UE to operate within a HON. The method 1100 can further include determining, at the ICN, that an interest packet issued by the UE is not able to be satisfied by any nodes of the ICN and providing the communication to the access network in response to the determination that the interest packet is not able to be satisfied. The method 1100 can further include storing the content at a node of the ICN. The method 1100 can further include maintaining an open pending interest at a gateway device that interfaces between the ICN and the HON.

Figure 12:
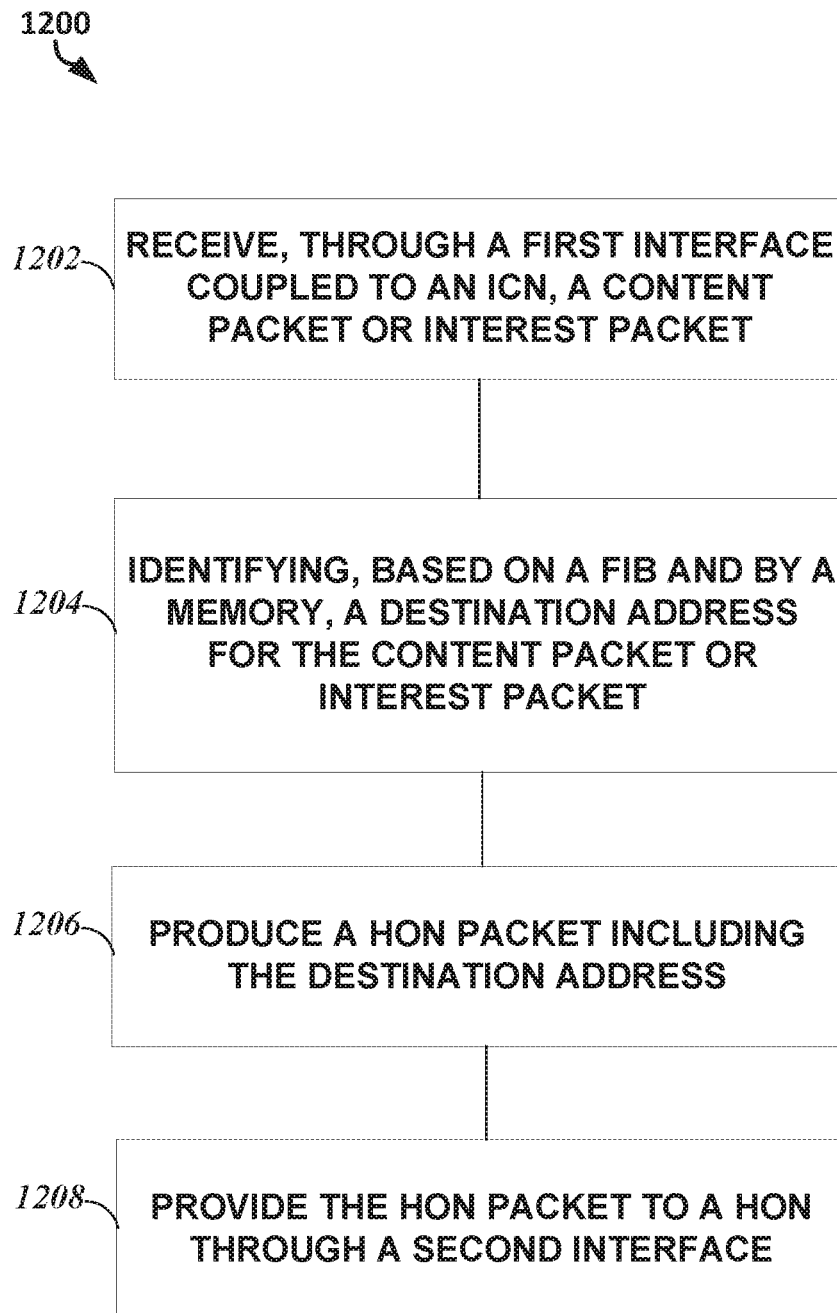
FIG. 12 illustrates, by way of example, a diagram of an embodiment of another method for interfacing between a HON and an ICN.

FIG. 12 illustrates, by way of example, a diagram of another embodiment of a method 1200 for interfacing between an ICN and a HON. The method 1200 can be performed by one or more components of the device coupled to the HON and the ICN, such as the device 1002. The method 1200, as illustrated, includes receiving, through a first interface coupled to an information-centric network (ICN), a content packet or interest packet, at operation 1202; identifying, based on a forwarding information base and by a memory, a destination address for the content packet or interest packet, at operation 1204; producing a host oriented network (HON) packet including the destination address, at operation 1206; and providing the HON packet to a HON through a second interface, at operation 1208.

The method 1200 can further include, wherein the HON packet includes at least one of a transmission control protocol (TCP) packet, an Internet protocol (IP) packet, and a user datagram protocol (UDP) packet. The method 1200 can further include receiving a HON packet from a node of the HON through the second interface. The method 1200 can further include producing a corresponding interest packet or content packet based on the mapping in the memory. The method 1200 can further include providing the produced interest packet or content packet to the ICN.

The method 1200 can further include, wherein the ICN is implemented as an overlay to the HON. The method 1200 can further include maintaining an open pending interest for content. The method 1200 can further include determining that an interest of an interest packet is unable to be satisfied by any nodes of the ICN and, in response, receiving the interest packet from the ICN.

Figure 13:
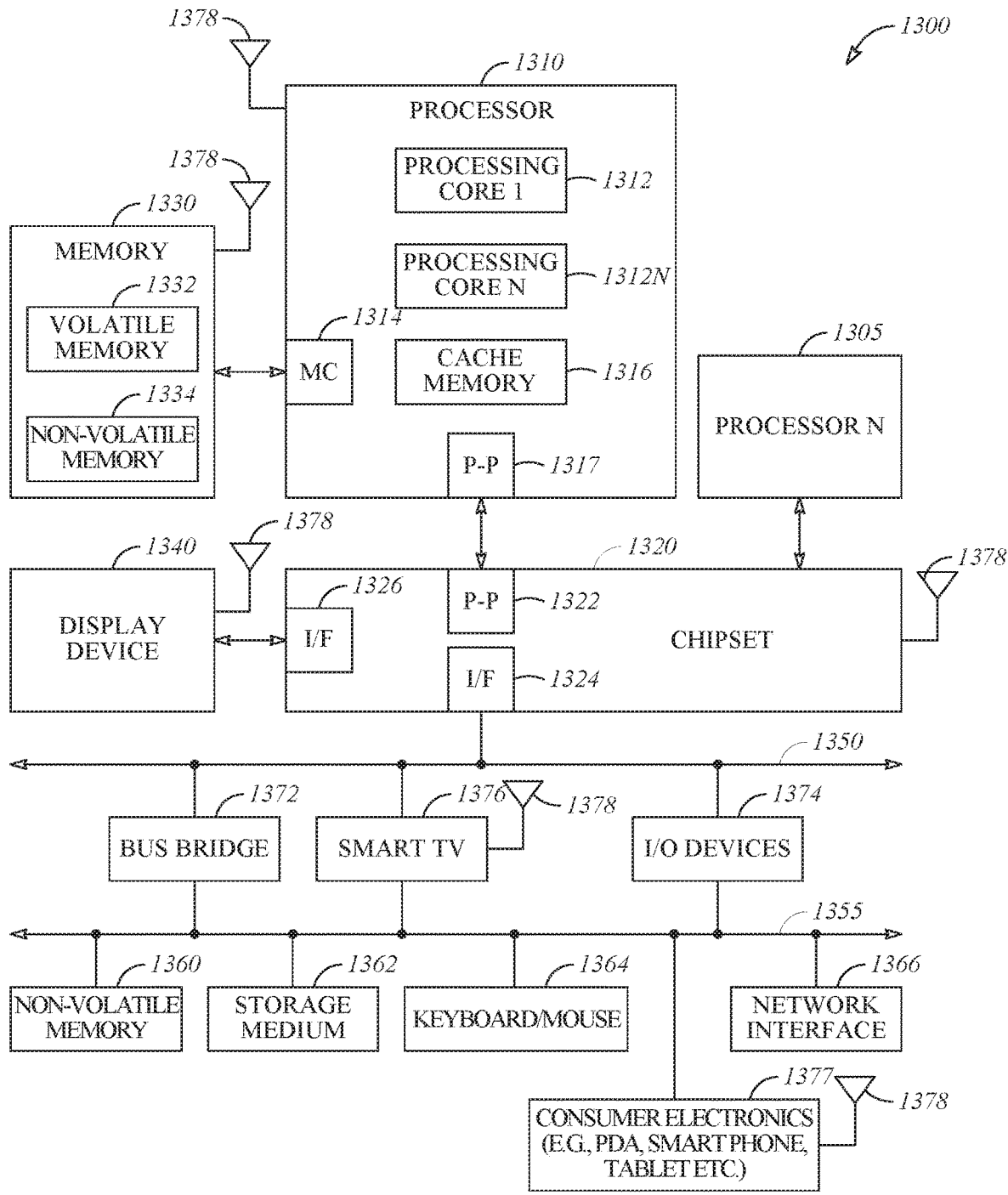
FIG. 13 illustrates, by way of example, a logical block diagram of an embodiment of a system.

FIG. 13 illustrates, by way of example, a logical block diagram of an embodiment of a system 1300. In one or more embodiments, the system 1300 includes one or more components that can be included in the device 1002, the HON 1004, the ICN 1006, the content processing circuitry 1016, the HON interface 1012, the ICN interface 1014, one or more components of the networks 500, 600, 700, 800, and 900, or other component discussed herein.

In one embodiment, processor 1310 has one or more processing cores 1312 and 1312N, where 1312N represents the Nth processing core inside processor 1310 where N is a positive integer. In one embodiment, system 1300 includes multiple processors including 1310 and 1305, where processor 1305 has logic similar or identical to the logic of processor 1310. In some embodiments, processing core 1312 includes, but is not limited to, pre-fetch logic to fetch instructions, decode logic to decode the instructions, execution logic to execute instructions, and the like. In some embodiments, processor 1310 has a cache memory 1316 to cache instructions and/or data for system 1300. Cache memory 1316 may be organized into a hierarchal structure including one or more levels of cache memory. One or more of the CS 502A-I can be implemented as cache memories.

In some embodiments, processor 1310 includes a memory controller 1314, which is operable to perform functions that enable the processor 1310 to access and communicate with memory 1330 that includes a volatile memory 1332 and/or a non-volatile memory 1334. In some embodiments, processor 1310 is coupled with memory 1330 and chipset 1320. Processor 1310 may also be coupled to a wireless antenna 1378 to communicate with any device configured to transmit and/or receive wireless signals. In one embodiment, the wireless antenna interface 1378 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 1332 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1334 includes, but is not limited to, flash memory, phase change memory (PCM), read-only memory (ROM), electrically erasable programmable read-only memory (EEPROM), or any other type of non-volatile memory device.

Memory 1330 stores information and instructions to be executed by processor 1310. In one embodiment, memory 1330 may also store temporary variables or other intermediate information while processor 1310 is executing instructions. The memory 1330 is an example of a machine-readable medium. While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine (e.g., the content processing circuitry 1016) and that cause the machine to perform any one or more of the techniques of the present disclosure, or that is capable of storing, encoding or carrying data structures used by or associated with such instructions. In other words, the various circuitry discussed herein can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In the illustrated embodiment, chipset 1320 connects with processor 1310 via Point-to-Point (PtP or P-P) interfaces 1317 and 1322. Chipset 1320 enables processor 1310 to connect to other elements in system 1300. In some embodiments of the present disclosure, interfaces 1317 and 1322 operate in accordance with a PtP communication protocol such as the Intel® Quick-Path Interconnect (QPI) or the like. In other embodiments, a different interconnect may be used.

In some embodiments, chipset 1320 is operable to communicate with processor 1310, 1305N, display device 1340, and other devices. Chipset 1320 may also be coupled to a wireless antenna 1378 to communicate with any device configured to transmit and/or receive wireless signals.

Chipset 1320 connects to display device 1340 via interface 1326. Display device 1340 may be, for example, a liquid crystal display (LCD), a plasma display, cathode ray tube (CRT) display, or any other form of visual display device. In some embodiments of the present disclosure, processor 1310 and chipset 1320 are merged into a single SOC. In addition, chipset 1320 connects to one or more buses 1350 and 1355 that interconnect various elements 1374, 1360, 1362, 1364, and 1366. Buses 1350 and 1355 may be interconnected together via a bus bridge 1372. In one embodiment, chipset 1320 couples with a non-volatile memory 1360, mass storage device(s) 1362, a keyboard/mouse 1364, and a network interface 1366 via interface 1324 and/or 1304, etc.

In one embodiment, mass storage device 1362 includes, but is not limited to, a solid state drive, a hard disk drive, a universal serial bus flash memory drive, or any other form of computer data storage medium. In one embodiment, network interface 1366 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the components shown in FIG. 13 are depicted as separate blocks within the system 1300, the functions performed by some of these blocks may be integrated within a single semiconductor circuit or may be implemented using two or more separate integrated circuits. For example, although cache memory 1316 is depicted as a separate block within processor 1310, cache memory 1316 (or selected aspects of 1316) can be incorporated into processor core 1312.

EXAMPLES AND NOTES

The present subject matter may be described by way of several examples.

Example 1 can include a device comprising a first interface coupled to a host-oriented network (HON), a second interface coupled to an information-centric network (ICN), a memory including data stored thereon mapping named data in the ICN to a respective host in the HON, and content processing circuitry to receive an interest packet or content packet from the ICN through the first interface, produce a corresponding HON packet based on the mapping in the memory, and provide the HON packet to the HON through the second interface.

In Example 2, Example 1 can further include, wherein the HON packet includes at least one of a transmission control protocol (TCP) packet, an Internet protocol (IP) packet, and a user datagram protocol (UDP) packet.

In Example 3, at least one of Examples 1-2 can further include, wherein the content processing circuitry is further to receive an IP packet from a node of the HON through the first interface, produce a corresponding interest packet or content packet based on the mapping in the memory, and provide the produced interest packet or content packet to the ICN.

In Example 4, at least one of Examples 1-3 can further include, wherein the device is a part of a base station of an access network.

In Example 5, at least one of Examples 1-3 can further include, wherein the device is a part of a service gateway of a core network.

In Example 6, at least one of Examples 1-3 can further include, wherein the device is a part of a mobility management entity of a core network.

In Example 7, at least one of Examples 1-3 can further include, wherein the device is a part of a router.

In Example 8, at least one of Examples 1-3 can further include, wherein the device is a part of a server.

In Example 9, at least one of Examples 1-3 can further include, wherein the device is a part of a user equipment.

Example 10 can include a non-transitory machine-readable medium including instructions that, when executed by a machine, cause the machine to perform operations comprising receiving, through a first interface coupled to an information-centric network (ICN), a content packet or interest packet, identifying, based on a forwarding information base and by a memory, a destination address for the content packet or interest packet, producing a host oriented network (HON) packet including the destination address, and providing the HON packet to a HON through a second interface.

In Example 11, Example 10 can further include, wherein the HON packet includes at least one of a transmission control protocol (TCP) packet, an Internet protocol (IP) packet, and a user datagram protocol (UDP) packet.

In Example 12, at least one of Examples 10-11 can further include, wherein the operations further comprise receiving a HON packet from a node of the HON through the second interface, producing a corresponding interest packet or content packet based on the mapping in the memory, and providing the produced interest packet or content packet to the ICN.

In Example 13, at least one of Examples 10-12 can further include, wherein the ICN is implemented as an overlay to the HON.

In Example 14, at least one of Examples 10-13 can further include, wherein the operations further comprise maintaining an open pending interest for content.

In Example 15, at least one of Examples 10-14 can further include, wherein the operations further comprise determining that an interest of an interest packet is unable to be satisfied by any nodes of the ICN and, in response, receiving the interest packet from the ICN.

Example 16 can include a method comprising receiving, at an access network of a host-oriented network (HON) and from a user equipment (UE) of an information-centric network (ICN), a communication requesting content from a node of the HON, providing, by one or more data radio bearers dedicated for transporting ICN packets between the UE and the access network, the communication to the access network, and providing, by the access network and over one or more EPS bearers, the requested content from the node of the HON to the UE.

In Example 17, Example 16 can further include, wherein the communication is over layer two or three of the access network.

In Example 18, at least one of Examples 16-17 can further include authenticating, by the access network, the UE to operate within a HON.

In Example 19, at least one of Examples 16-18 can further include determining, at the ICN, that an interest packet issued by the UE is not able to be satisfied by any nodes of the ICN and providing the communication to the access network in response to the determination that the interest packet is not able to be satisfied.

In Example 20, at least one of Examples 16-19 can further include storing the content at a node of the ICN.

In Example 21, at least one of Examples 16-20 can further include maintaining an open pending interest at a gateway device that interfaces between the ICN and the HON.

Each of these non-limiting examples can stand on its own, or can be combined in various permutations or combinations with one or more of the other examples. Non-transitory merely means that the medium is a tangible media.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present applicants also contemplate examples in which only those elements shown or described are provided. Moreover, the present applicants also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it is not be used to interpret or limit the scope or meaning of the claims. Also, in the above Detailed Description, various features may be grouped together to streamline the disclosure. This should not be interpreted as intending that an unclaimed disclosed feature is essential to any claim. Rather, patentable subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present disclosure should be determined with reference to the appended claims, along with the full scope of equivalents to which such claims are entitled.

What is claimed is:

1. A device comprising:
a first interface to couple to a host-oriented network (HON);
a second interface to couple to an information-centric network (ICN);
a memory including data stored thereon mapping named data in the ICN to a host in the HON; and
content processing circuitry configured to:
receive an interest packet from the ICN through the second interface,
provide the interest packet to an edge node of the ICN,
receive a communication indicating the edge node cannot satisfy the interest packet,
responsive to receiving the communication, produce a corresponding HON packet based on the mapping in the memory, and
provide the HON packet to the HON through the first interface.

2. The device of claim 1, wherein the HON packet includes at least one of a transmission control protocol (TCP) packet, an Internet protocol (IP) packet, and a user datagram protocol (UDP) packet.

3. The device of claim 1, wherein the content processing circuitry is further to receive an IP packet from a node of the HON through the first interface, produce a corresponding interest packet or content packet based on the mapping in the memory, and provide the produced interest packet or content packet to the ICN.

4. The device of claim 1, wherein the device is a part of a base station of an access network.

5. The device of claim 1, wherein the device is a part of a service gateway of a core network.

6. The device of claim 1, wherein the device is a part of a mobility management entity of a core network.

7. The device of claim 1, wherein the device is a part of a router.

8. The device of claim 1, wherein the device is a part of a server.

9. The device of claim 1, wherein the device is a part of a user equipment.

10. A non-transitory machine-readable medium including instructions that, when executed by a machine, cause the machine to perform operations comprising:
receiving, through a first interface coupled to an information-centric network (ICN), a content packet or interest packet;
identifying, based on a forwarding information base and by a memory, a destination address for the content packet or interest packet;
providing the interest packet to an edge node of the ICN,
receiving a communication indicating the edge node cannot satisfy the interest packet,
responsive to receiving the communication, producing a host oriented network (HON) packet including the destination address; and
providing the HON packet to a HON through a second interface.

11. The machine-readable medium of claim 10, wherein the HON packet includes at least one of a transmission control protocol (TCP) packet, an Internet protocol (IP) packet, and a user datagram protocol (UDP) packet.

12. The machine-readable medium of claim 10, wherein the operations further comprise:
receiving a HON packet from a node of the HON through the second interface;
producing a corresponding interest packet or content packet based on the mapping in the memory; and
providing the produced interest packet or content packet to the ICN.

13. The machine-readable medium of claim 10, wherein the ICN is implemented as an overlay to the HON.

14. The machine-readable medium of claim 10, wherein the operations further comprise maintaining an open pending interest for content.

15. The machine-readable medium of claim 10, wherein the operations further comprise determining that an interest of an interest packet is unable to be satisfied by any nodes of the ICN and, in response, receiving the interest packet from the ICN.

16. A method comprising:
receiving, at an access network of a host-oriented network (HON) and from a user equipment (UE) of an information-centric network (ICN), a communication requesting content from a node of the HON;
providing, by one or more data radio bearers dedicated for transporting ICN packets between the UE and the access network, the communication to the access network;
providing the interest packet to an edge node of the ICN;
receiving a communication indicating the edge node cannot satisfy the interest packet; and
responsive to receiving the communication, providing, by the access network and over one or more EPS bearers, the requested content from the node of the HON to the UE.

17. The method of claim 16, wherein the communication is over layer two or three of the access network.

18. The method of claim 16, further comprising authenticating, by the access network, the UE to operate within a HON.

19. The method of claim 16, further comprising determining, at the ICN, that an interest packet issued by the UE is not able to be satisfied by any nodes of the ICN and providing the communication to the access network in response to the determination that the interest packet is not able to be satisfied.

20. The method of claim 16, further comprising storing the content at a node of the ICN.

21. The method of claim 16, maintaining an open pending interest at a gateway device that interfaces between the ICN and the HON.

* * * * *